April 14, 1936.  E. M. PFAUSER  2,037,434
PUMP
Filed June 29, 1934
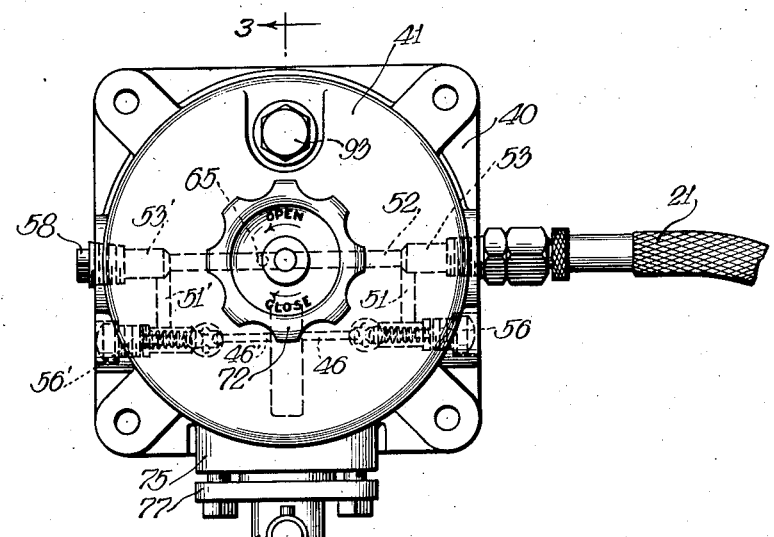
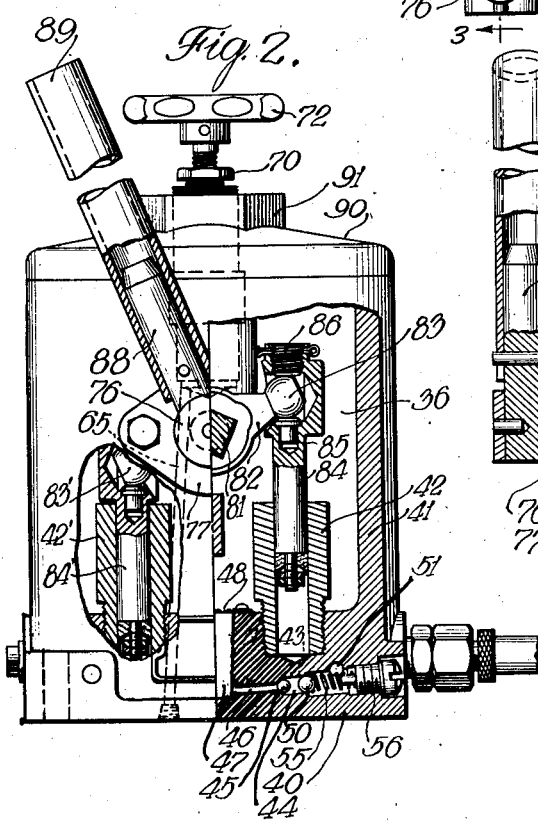
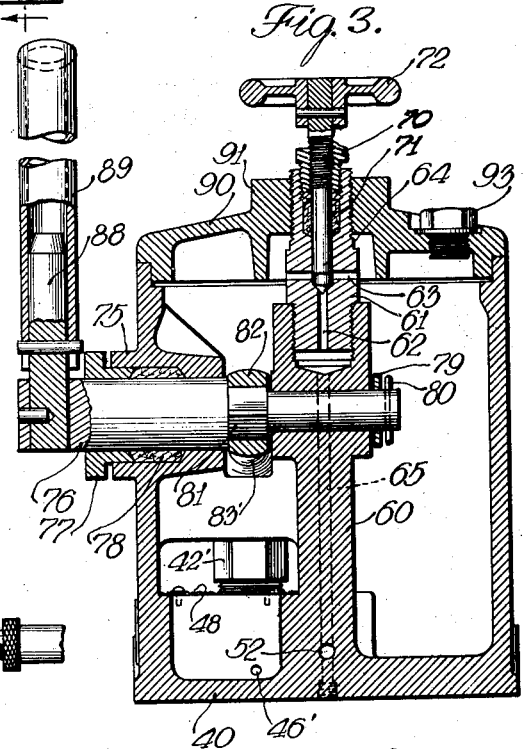
Inventor
Edward M. Pfauser
By Brown, Jackson, Boettcher & Dienner
Attorneys.

Patented Apr. 14, 1936

2,037,434

UNITED STATES PATENT OFFICE 2,037,434

PUMP

Edward M. Pfauser, Milwaukee, Wis., assignor to Blackhawk Mfg. Co., Milwaukee, Wis., a corporation of Wisconsin Application June 29, 1934, Serial No. 733,006

4 Claims. (Cl. 103—41)

This invention relates to pumps in general, and more particularly to pumps for motor driven snow plows of the type provided with manually operated means for manipulating the plow, that is, for changing its elevation or angularity.

Snow plows are frequently mounted at the front of an automobile truck, tractor or the like, which is provided with the usual automobile type controls including a clutch, brake, gear shift lever, steering wheel, gas feed, etc., all arranged in convenient location with respect to the driver's seat. The snow plow is mounted so that it may be raised or lowered by the driver, through means including usually a hand wheel located appreciably to the right of the position occupied by the driver when driving the automobile. The mechanism for manipulating the snow plow is manually operated and, since the weights involved and the friction present are both rather large, the driver must exert an appreciable amount of force to turn the hand wheel. This introduces certain difficulties if the plow adjustment is to be made while the automobile is in motion. At such times the driver must keep one hand on the steering wheel to maintain control of the automobile, while he reaches with the other hand sidewise to turn the plow lifting wheel. Since a large amount of power must be applied to the plow lifting wheel it is difficult for the driver to maintain a steady control of the steering wheel. This difficulty arises for two reasons. First, since the plow lifting wheel is located an appreciable distance to one side of the driver and requires a side push or pull, it is natural for the driver to steady his body by exerting an opposite force on the steering wheel. This is not conducive to the maintenance of the automobile in its required course. Secondly, since the plow actuating means is in the form of a hand wheel, the direction of application of force by the driver must change from a push to a pull, and from a pull to a push, during each revolution of the hand wheel. This, certainly, is not conducive to the maintenance of a steady control of the steering wheel. This condition is aggravated by the fact that a comparatively large force is required to actuate the plow adjusting wheel.

It is an object of the present invention to provide an improved power pump unit which, while of general application, is particularly adapted for use in connection with a ram operating a snow plow. The pump unit of the present invention is simple and rugged in construction, has a minimum of exposed parts that may be subject to leakage or injury, and may be operated to control the rate of lowering of the snow plow as desired.

The attainment of the above and further objects of the present invention will be apparent from the following specification taken in conjunction with the accompanying drawing forming a part thereof In the drawing:

Figure 1 is a top view of a pump unit of my invention;

Figure 2 is a front view, in partial section, of the unit shown in Figure 1; and Figure 3 is a sectional view taken along the line 3—3 of Figure 1 and looking in the direction of the arrows.

Reference may now be had more particularly to Figure 1. The pump unit comprises a cast metal base 40, of a substantially square shape, and having an integrally formed cylindrical portion 41 constituting a single casting with the base and defining the sump chamber of the power unit and a housing for the two power pumps. A pair of pump cylinders 42, 42' are threaded into the base 40. The pump cylinder 42 communicates, through a port 43 and valve chamber 44 and inlet check valve 45, with an inlet port 46 that extends to an inlet trough 47 that receives oil, or other fluid used, from the body of the cylindrical chamber 36 through an oil straining screen 48. An outlet check ball valve 50 controls communication between the port 43 and an outlet port 51 that extends to a transverse canal or port 52 that opens into an outlet 53 to which the hose 21 is connected, said hose extending to a hydraulic ram. A comparatively light spring 55 serves to hold the check ball valve 50 against its seat at all times to give instantaneous closing at relatively low loads. A threaded plug 56 closes the valve chamber outside opening, being readily removable to allow access to the valves. This eliminates the necessity to tear down the unit when it is desired to inspect the valves.

Inasmuch as the two pumps of the unit are of identical construction similar reference numerals have been used, the reference numerals being primed when applied to the pump unit at the left hand side of Figures 1 and 2.

The port 52 extends through the base 40 and is provided with a closure pipe plug 58 at its left hand end as seen in Figure 1. If desired, the pipe 21 may be connected to the left hand side of the port 52, at the opening that receives the plug 58, instead of in the manner shown, or both openings may be used to operate two rams simultaneously.

A standard 60 rises from the center of the base 40, being an integral part of the base casting. The upper end of the standard 60 is threaded to receive a release valve housing 61 that threads into the standard and is provided with a longitudinally extending port 62 closed from communication with a cross passageway 63 by a release valve spindle 64. A release port 65 is formed through the standard 60 and communicates, at its lower end, with the port 52, while at its upper end it communicates with the port 62 so that, upon movement of the release valve spindle 64 to its open position, there is established communication between the pipe 21 by way of the ports 52, 65, 62, and 63, with the interior of the chamber 36. The release valve spindle 64 is held in place by a release valve packing nut 70 which threads into the release valve housing 61, and which is internally threaded to receive the release valve spindle. Suitable packing 71 is provided for sealing against leakage of oil from the chamber 41. A release valve wheel 72 is provided for turning the release valve spindle 64 to open or close the valve.

The cylindrical wall 41 is provided, at the side thereof, with an extension 75 having a central bore therethrough which supports, and constitutes a bearing for, a rocker arm shaft 76. A suitable packing gland 77 and packing 78 are provided to seal against outward leakage of oil. The inner end of the rocker arm shaft is journaled in the upright 60 and is held in place, against retraction, by a washer 79 and a cotter pin 80. The shaft 76 has a squared portion 81 to which is secured a rocker arm 82 having spherical ends 83 which extend into recesses in the pump plungers 84 and 84'. The pump plunger 84 is provided with a button 85 of relatively hard material, which takes the wear between the rocker arm and the pump plunger. An adjusting screw 86 is provided for taking up the adjustment. A pump handle shaft 88 is secured to the shaft 76 and receives a pump handle 89 for rocking the shaft 76 to actuate the pump.

The upper portion of the release valve housing 62 is externally threaded, and on this there is threaded a top cap 90 having an hexagonal head 91 to facilitate turning thereof. The top cap 90 forms a liquid tight seal with the cylindrical wall 41. A filler plug 93 closes an opening in the cap 90 through which the reservoir 36 may be filled with oil, or other suitable fluid used.

A rocking movement of the handle 89 causes a reciprocation of the pump pistons 84 and 84' to actuate both pumps to force fluid through the pipe 21 to the ram. The check valves 50 prevent a return flow of the fluid from the ram, so that the ram remains in the position to which it has been actuated. If it is desired to lower the ram it is merely necessary to operate the release valve wheel 72 whereby oil may flow from the ram, through the pipe 21 and port 52, thence by way of the ports 65 and 62 to the ports 63, and thence into the reservoir defined by the cylindrical wall 41. The extent of opening of the release valve determines the rate of oil flow and it is thus possible to obtain a fast or a slow lowering movement of the snow plow or other device actuated by oil from the pressure unit.

The unit shown in Figures 1, 2, and 3, is sturdy in construction and is well adapted for rough usage. There can be no loss of oil by leakage at the pump cylinders, pump pistons, or check valves, since any oil leaking at those points will flow back into the oil chamber 41. Also no dirt or other foreign substances may form on the pump pistons and produce contamination of the oil, or wear of the pump cylinders, such as must necessarily take place if the pumps were located outside of the sump chamber.

In compliance with the requirements of the patent statutes I have herein shown and described a few preferred embodiments of my invention. It is however to be understood that the invention is not limited to the precise constructions herein shown, the same being merely illustrative of the principles of the invention. What I consider new and desire to secure by Letters Patent is:

1. A pump including a housing having a base, a pump cylinder and pump piston carried by said base, a standard extending upwardly from the central portion of said base clear of the walls of the housing, whereby the latter forms a sump chamber, a release port communicating with the discharge of the pump and extending through the standard to the upper portion thereof, a release valve fitting communicating with the upper end of said release port and anchored to the standard, valve means in said fitting, and a cover for said housing secured in place solely by said release valve fitting.

2. A pump including a housing having a base, a pump cylinder and a pump piston carried by said base within the housing, a standard extending upwardly from the central portion of said base clear of the walls of the housing, whereby the latter forms a sump chamber, a rock shaft connected with the piston for driving the same and extending into the housing from the outside thereof and journaled at its inner end in the upper portion of said standard, a release port communicating with the discharge of the pump and extending through the standard to the upper portion thereof above said rock shaft, a release valve fitting communicating with the upper end of said release port and anchored to the standard, valve means in said fitting, and a cover for said housing secured in place solely by said release valve fitting.

3. A pump including a generally cylindrical housing including a base portion and an open upper end, a pump cylinder and a pump piston carried by said base, means for driving the pump including a rock shaft journaled in the side wall of said cylindrical housing, a vertically extending stem formed integral with the central portion of said base and extending upwardly in line with the vertical axis of said housing, a release port serving as a by-pass port for the pump and formed in said vertically disposed stem and extending upwardly to the top thereof, the upper end of said stem being enlarged and provided with an internally threaded upwardly facing opening with which said release port communicates, a release valve fitting threaded into said opening and having duct means communicating with said port and the interior of said housing, release valve means carried by said fitting for controlling the flow through said duct means, the upper portion of said fitting being externally threaded, and cover means for said cylindrical housing threaded onto the upper end of said fitting and secured in place solely thereby in leak-tight relation on the open upper end of said housing.

4. A pump including a generally cylindrical housing including a base portion and an open upper end, a pump cylinder and a pump piston carried by said base within the housing, means for driving the pump including a rock shaft journaled in the side wall of said cylindrical housing, a vertically extending stem formed integral with the central portion of said base and extending upwardly in line with the vertical axis of said housing, the inner end of said rock shaft being supported by the upper portion of said stem, a release port serving as a by-pass port for the pump and formed in said vertically disposed stem and extending upwardly to the top thereof at one side of said rock shaft, the upper end of said stem being enlarged and provided with an internally threaded release chamber with which said release port communicates, a valve fitting threaded into said chamber and having a duct communicating with said port, valve means carried by said fitting for controlling the flow through the duct therein, the upper portion of said fitting being externally threaded, and cover means for said cylindrical housing threaded onto the upper end of said fitting and secured in place solely thereby in leak-tight relation on the open upper end of said housing.

EDWARD M. PFAUSER.